A. E. GUY.
STEAM POWER PLANT AND THE LIKE.
APPLICATION FILED APR. 30, 1908.
1,006,477.
Patented Oct. 24, 1911.
2 SHEETS—SHEET 1.
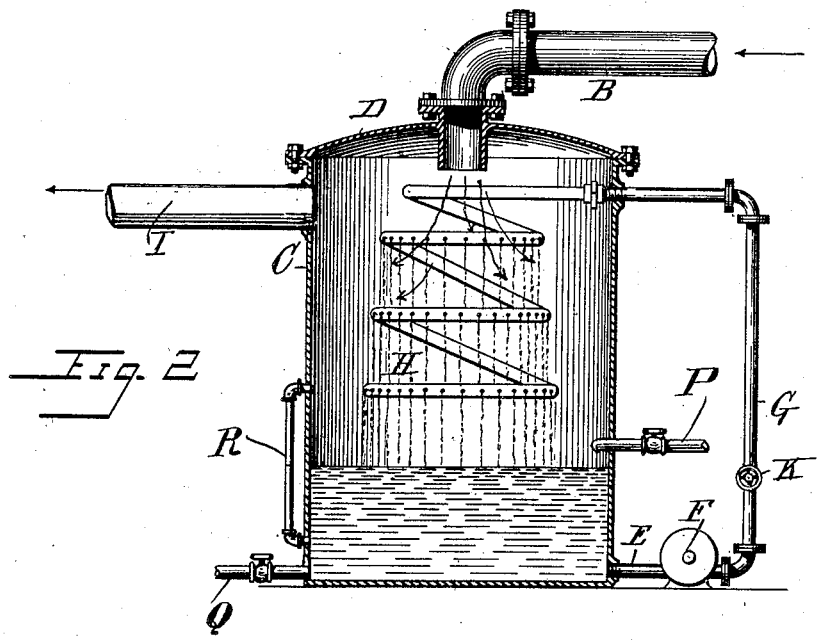
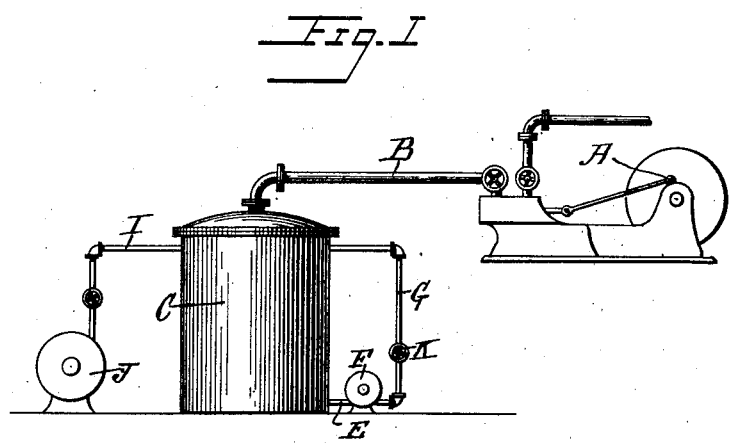
Witnesses:
Inventor:
Albert E. Guy
By his Attorneys A. E. GUY.
STEAM POWER PLANT AND THE LIKE.
APPLICATION FILED APR. 30, 1908.
1,006,477.
Patented Oct. 24, 1911.
2 SHEETS—SHEET 2.
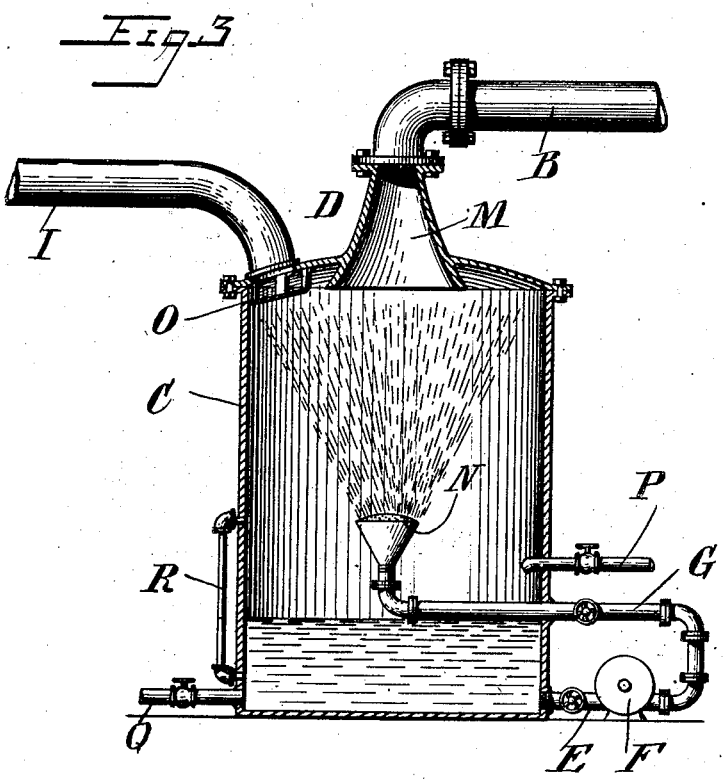
Attest:
Inventor:
Albert E. Guy
by
Attys

UNITED STATES PATENT OFFICE.

ALBERT E. GUY, OF TRENTON, NEW JERSEY, ASSIGNOR TO DE LAVAL STEAM TURBINE COMPANY, OF NEW YORK, N. Y., A CORPORATION OF NEW JERSEY.

STEAM-POWER PLANT AND THE LIKE.

1,006,477.   Specification of Letters Patent.   Patented Oct. 24, 1911.

Application filed April 30, 1908. Serial No. 430,044.

*To all whom it may concern:*

Be it known that I, ALBERT E. GUY, a citizen of the United States of America, and a resident of Trenton, county of Mercer, and State of New Jersey, have invented certain new and useful Improvements in Steam-Power Plants and the Like, of which the following is a specification.

This invention relates to steam power plants and the like and comprises two steam motors, the second employing as its working fluid the exhaust from the first motor, such first motor being one which ordinarily operates intermittently, or under a variable load, and an accumulator interposed between the motors, and comprising means for spraying liquid contained within said accumulator into the working fluid exhausted from the first motor into said accumulator, whereby surplus heat energy, available when the first of said motors is delivering a relatively large amount of exhaust steam, is stored up to be given off later when such first motor is giving off a much less quantity of exhaust steam.

My invention also comprises the construction of this accumulator.

It is well known that turbine steam motors are particularly efficient, as compared with reciprocating steam motors, when operating on low pressure steam, provided they work at fairly constant load. For this reason it has been proposed to discharge the exhaust steam from a reciprocating engine into a turbine, the latter preferably working condensing and often receiving its steam at a pressure little if any greater than that of the atmosphere. The turbine then corresponds to the low pressure cylinder of a multi-stage steam engine (compound, triple expansion, etc.), but if worked at fairly constant load is much more efficient than a low pressure cylinder would be besides being much less bulky and less expensive. But where the first or high pressure motor operates very intermittently, as for example in the case of mining engines, elevator and hoisting engines, rolling mill engines, etc., it has not been practicable to operate a turbine by the steam exhausted from such engines owing to the extremely irregular delivery of the steam to the turbine, which makes it practically impossible for the turbine to carry a load, if supplied from the intermittently operated engine alone, and in any event makes the turbine relatively inefficient in operation. By interposing an accumulator, however, these difficulties are overcome. The accumulator may be a very simple apparatus, comprising a vessel adapted to withstand the relatively low pressures to which it will ordinarily be subjected, having means within it for mixing water with the steam received by it from the intermittently operating engine, and having a connection through which steam may be supplied from it to the second motor or turbine. In the accompanying drawings I illustrate such a system.

In said drawings: Figure 1 shows in elevation, and more or less diagrammatically, a power system comprising a primary motor and a secondary motor, the former illustrated as being a reciprocating engine, and the latter illustrated as being a turbine, with an accumulator such as referred to interposed between these motors; Fig. 2 shows a central vertical section of such an accumulator, on a larger scale; Fig. 3 shows a similar section of an alternative form of accumulator. In Fig. 1 a steam generator is omitted but it will be understood that steam will be supplied to the primary motor in the usual manner.

Referring first to Fig. 1, A designates the primary motor which usually operates more or less intermittently—that is to say, is either started and stopped frequently or else operates on a fluctuating load, B designates the exhaust pipe thereof and C the accumulator. I designates a pipe for conveying steam from this accumulator to the secondary motor J. While it is, in a broad sense, immaterial whether this motor J be a reciprocating motor or a turbine, in general it will be preferable to have such secondary motor a turbine. The accumulator C may be either of the construction shown in Fig. 3, or of any other suitable construction.

Referring now to Fig. 2 showing one construction of such accumulator, said accumulator comprises, as will be seen, a closed vessel having the inlet connection B and the outlet connection I and having normally within it a greater or less body of water, according to circumstances. For mingling the entering steam with this water I will commonly use means for converting the water into a spray filling more or less completely the upper portion of vessel C. To this end I have shown in Fig. 2 a perforated coil spray pipe H to which water is supplied by a rotary pump F, the suction of which is connected by pipe E to the lower portion of vessel C, the delivery of the pump being connected by pipe G to the spray pipe H. This pump being in operation, water is drawn from the lower portion of vessel C, and sprayed from the orifices of pipe H, forming a downwardly descending shower filling more or less completely the upper portion of the vessel C and, being finely divided, in condition to combine with and absorb the steam entering said chamber through pipe B.

As will be understood readily, during periods when relatively large quantities of steam are coming from the primary motor A through pipe B into the chamber C, a considerable proportion of this steam will be condensed by the water spray in chamber C, the quantity of water in said chamber increasing and the pressure and temperature within said vessel rising more or less. During periods when less steam is being delivered from the primary motor A than is desired or required for the operation of the secondary motor J, the water in vessel C will evaporate, supplying steam to the secondary motor in excess of what may be coming over from the primary motor at the instant. The amount of steam which may be so supplied to the secondary motor in excess of what is delivered by the primary motor, is of course dependent upon the amount of water in vessel C; but said vessel may be made of great or small capacity according to the conditions which ordinarily obtain in the operation of the plant; and thus it is possible to operate motor J with steam at nearly constant pressure and to supply to such motor J an amount of steam substantially corresponding to the average amount of steam delivered by the primary motor.

Location of the circulating pump F outside of vessel C is exceedingly desirable and is an important feature of my invention, since it is then relatively easy to drive the said pump, and also to keep it in working order, and it is quite feasible at times to stop the operation of this circulating pump and make such temporary repairs and replacements as may be done in a short space of time, even while the secondary motor J is operating, the amount of condensed steam which can be accumulated in vessel C being, ordinarily, sufficient to operate the secondary motor J for a time, even if the supply of steam from the primary motor A is discontinued altogether.

In Fig. 3 I illustrate a form of accumulator I consider preferable to that shown in Fig. 2. The accumulator vessel in itself is of substantially the same construction as shown in Fig. 2, but to reduce the velocity with which the stream enters said accumulator, and so both to avoid the disturbing action of a high velocity jet of steam upon the body of water in the accumulator, and also to prolong the period of contact between the steam and the water spray in the accumulator, steam is delivered from the pipe B to the interior of the accumulator, through an expansion nozzle M. Also, to prolong the period during which any particular increment of the water discharged from the spray pipe is exposed directly to the action of the incoming steam, I have shown the spray pipe arranged to project the water upwardly, the pipe G being provided with a rose or other suitable spraying device N, the top of which is slightly above the intended maximum water level within the vessel. To prevent free moisture from being carried off with the steam passing out through pipe I, I have provided a baffle O guarding the mouth of this pipe I. The operation of this form of accumulator will obviously be the same as of that shown in Fig. 2, so that no further description of the operation is required.

I preferably provide both forms of accumulator with a water supply pipe P and a drain pipe Q, both suitably valved and I preferably provide shut off valves K and L between the pump and the accumulator. I also preferably provide the accumulator with a suitable gage glass or other level indicator R.

I use the term "steam" as employed herein to designate any condensable vaporous working fluid. It may either be water vapor or the vapor of any other of the working fluids commonly employed in heat engines, such for example as hydrocarbon vapor, ether, etc. Spraying the water into the upper portion of the accumulator also facilitates greatly the conversion of water into steam, making such conversion much more rapid than when evaporation takes place from the surface of the solid body of liquid.

What I claim is:—

1. A steam power plant comprising in combination a primary motor, a secondary motor, a closed chamber adapted to contain liquid, conduits connecting said chamber with the exhaust outlet of the primary motor, and with the inlet of the secondary motor, and spraying means within said chamber connected to the liquid space in the lower part of said chamber and arranged to discharge liquid drawn from such space, as a spray, upwardly into the upper part or steam space of said chamber.

2. A steam power plant comprising in combination a primary motor, a secondary motor, a closed chamber adapted to contain liquid, conduits connecting said chamber with the exhaust outlet of the primary motor and with the inlet of the secondary motor, pumping means arranged to draw liquid from the lower portion of said chamber, and spraying means arranged to receive liquid from said pumping means and located within said chamber and directed to discharge spray, upwardly, into the upper part or steam space of said chamber.

3. A steam power plant comprising in combination a primary motor, a secondary motor, a closed chamber adapted to contain liquid, conduits connecting said chamber with the exhaust outlet of the primary motor and with the inlet of the secondary motor, pumping means external to said chamber arranged to draw liquid from the lower portion thereof, and spraying means located within said chamber and arranged to direct spray into the upper part or steam space thereof and connected to said pumping means to receive liquid therefrom.

4. A steam power plant comprising in combination a primary motor, a secondary motor, a closed chamber adapted to contain liquid, conduits connecting said chamber with the exhaust outlet of the primary motor and with the inlet of the secondary motor, pumping means arranged to draw liquid from the lower portion of said chamber, and upwardly-directed spraying means arranged to discharge spray into the upper part of said chamber and connected to said pumping means to receive liquid therefrom.

5. An accumulator for steam power systems such as described, comprising a closed vessel having steam inlet and discharge openings, an upwardly directed spraying device, and means for drawing liquid from the lower portion of such accumulator and delivering the same to said spraying device.

6. An accumulator for steam power systems such as described, comprising a closed vessel having steam inlet and discharge openings, a spraying device, and an external pump for drawing liquid from the lower portion of such accumulator and delivering the same to said spraying device.

7. An accumulator for steam power systems such as described, comprising in combination a closed vessel, an expansion nozzle adapted for connection to a source of supply of steam, a spraying device, means for drawing liquid from the lower portion of the accumulator and delivering the same to said spraying device, a steam discharge connection, and means guarding such connection against the passage of free liquid thereto.

8. An accumulator for steam power systems such as described, comprising in combination a closed vessel, an expansion nozzle adapted for connection to a source of supply of steam, a spraying device, means for drawing liquid from the lower portion of the accumulator and delivering the same to said spraying device, a steam discharge connection and a baffle guarding such discharge connection.

9. An accumulator for steam power systems such as described, comprising a closed vessel having steam inlet and discharge openings, an upwardly directed spraying device arranged to project above the liquid level of said vessel, and means for drawing liquid from the low portion of such accumulator and delivering the same to such spraying device.

10. An accumulator for steam power systems such as described, comprising a closed vessel adapted to contain water of condensation and having steam inlet and discharge openings, means for spraying water into the space above the liquid in such vessel, such means connected with the lower portion of the vessel to draw water therefrom, and an expansion device communicating with the inlet opening and arranged to direct entering steam toward the surface of water in said vessel.

11. An accumulator for steam power systems, such as described, comprising a closed vessel adapted to contain water of condensation, and having steam inlet and discharge openings, means for spraying water into the space above the liquid in such vessel, connected with the lower portion of the vessel to draw water therefrom, and an expansion nozzle communicating with the inlet opening and arranged to direct entering steam toward the surface of the water in said vessel.

In testimony whereof I have signed this specification in the presence of two subscribing witnesses.

ALBERT E. GUY.

Witnesses:
H. M. MARBLE,
FRANK E. RAFFMAN.